United States Patent
Op Den Camp et al.

[11] Patent Number: 6,152,466
[45] Date of Patent: Nov. 28, 2000

[54] COMPOSITE-STRUCTURE AXLE JOURNAL

[75] Inventors: Eckart Op Den Camp, Koblenz; Ulrich Seuser, Neuwied, both of Germany

[73] Assignee: Lucas Industries public limited company, United Kingdom

[21] Appl. No.: 09/034,390

[22] Filed: Mar. 4, 1998

Related U.S. Application Data

[63] Continuation of application No. PCT/EP96/03938, Sep. 9, 1996.

[30] Foreign Application Priority Data

Sep. 8, 1995 [DE] Germany ............................. 195 33 315

[51] Int. Cl.$^7$ ...................................................... B62D 7/18
[52] U.S. Cl. ...................................................... 280/93.512
[58] Field of Search ...................... 280/93.512, 124.125, 280/124.145, 124.146, 124.154; 188/18 A

[56] References Cited

U.S. PATENT DOCUMENTS

| | | | |
|---|---|---|---|
| 3,147,026 | 9/1964 | Schilberg . | |
| 3,749,415 | 7/1973 | Sampatacos | 280/96.1 |
| 3,865,394 | 2/1975 | Epner et al. | 280/96.1 |
| 3,940,159 | 2/1976 | Pringle | 280/96.1 |
| 4,031,986 | 6/1977 | Thompson | 188/72.4 |
| 4,722,540 | 2/1988 | Kozyra et al. | 280/93 |
| 4,761,019 | 8/1988 | Dubensky | 280/674 |
| 5,120,150 | 6/1992 | Kozyra et al. | 403/24 |

FOREIGN PATENT DOCUMENTS 571476A 10/1958 Belgium .

OTHER PUBLICATIONS

Patent Abstracts of Japan, vol. 005, No. 155 (M090);.
Patent Abstracts of Japan JP 56 082668 A; and.
European Search Report fpr PCT Application Serial No. PCT/EP96/03938, the parent of this application from which priority is claimed.

*Primary Examiner*—Paul N. Dickson
*Attorney, Agent, or Firm*—Wood, Herron & Evans LLP

[57] ABSTRACT

An axle journal (20), especially for the front axle of a front wheel drive motor vehicle comprises a main body (30) made of shaped sheet metal parts (32, 34) which enclose a circumferentially extending cavity (36). The cavity (36) houses portions (43) and (46) of mounting components (brake carrier member 42 and a combination 45 steering tie rod mount and transverse link seat) which portions stiffen the axle journal (20). The section of the cavity not taken up by the stiffening portions of the mounting components may be foam-filled. This composite-structure axle journal can be manufactured at low cost due to the reduced mechanical finishing required and can sustain heavy loads, whereby it meets present day requirements of lightweight construction.

24 Claims, 3 Drawing Sheets

COMPOSITE-STRUCTURE AXLE JOURNAL

The present application is a continuation of applicant's PCT application PCT/EP96/03938, filed Sep. 9, 1996, currently pending, and claiming priority of German Patent No. 195 33 315.2 filed Sep. 8, 1995.

The invention relates to an axle journal for vehicles, especially for the front axle of a front wheel drive motor vehicle. Such axle journals nowadays also are referred to as swivel bearings if they take up only the wheel bearing and if an associated drive axle of the vehicle extends all the way into their center.

In motor vehicle construction, axle journals normally are cast or forged one-piece steel members. Often the axle journal is formed integrally with an arm to serve as support for fastening of a strut or an upper transverse link. Additionally, the axle journal may be formed, for example, with a steering tie rod mount and/or a seat for a transverse link. Generally speaking, it may be formed with structural members the purpose of which is the mounting of wheel suspension or steering gear elements on the axle journal. In the case of the conventional cast, forged, or welded axle journals these mounting components are formed integrally with the axle journal.

It is the object of the invention to provide an axle journal which is of lighter weight structure than conventional axle journals and yet highly stable and which, moreover, is inexpensive to manufacture.

Starting from an axle journal of the kind mentioned initially, this object is met in that the main body of the axle journal is made of sheet metal parts shaped so as to be suitable for interconnection and, when interconnected, enclosing a continuous cavity prepared to receive portions of structural components which are adapted accordingly, which stiffen the axle journal, and which are provided so that wheel suspension or steering gear elements or a brake can be mounted and fastened on the axle journal. The axle journal according to the invention thus is a composite structure made of the shaped sheet metal parts and the stiffening portions of the mounting components which, in assembled state, are enclosed in the sheet metal parts. It is inexpensive to manufacture the shaped sheet metal parts; and the main body of the axle journal, composed of those parts and usually being of ring shape, derives its operative strength from the combination with the stiffening portions of the mounting components mentioned.

In a preferred embodiment of the axle journal according to the invention the stiffening portions of the mounting components fill the cavity at least almost completely, as regards the cross section thereof. As far as the circumferential extension thereof is concerned, they fill it at least approximately by half, better still by two thirds and preferably three quarters or more. The load carrying capacity of the axle journal increases as the extension in circumferential direction of the stiffening portions increases, although this is achieved at the expense of the weight advantages to be obtained over conventional embodiments.

The portions which stiffen the axle journal, for example, may be part of a brake carrier member or a steering tie rod mount or a transverse link seat. When the cavity of the axle journal main body defined by the sheet metal parts is annular, those portions of the mounting components which stiffen the axle journal, preferably, have the shape of a circular ring segment. The sheet metal parts are formed with openings through which those portions of the mounting components not received in the cavity can project.

In a particularly preferred embodiment of the axle journal according to the invention the main body thereof, especially being of ring shape, is composed of two shaped sheet metal parts of which one has a predominantly U-shaped cross section, while the other one is of predominantly planar shape. Upon assembly, the predominantly planar sheet metal part closes the open side of the sheet metal part which has the U-shaped cross sectional configuration. The cavity enclosed by the two sheet metal parts thus is torus-shaped. According to a further development the predominantly planar sheet metal part includes a collar formed at its continuous inner edge and projecting into the cavity. This collar may engage in those portions of the mounting components which stiffen the axle journal, and it may be formed simply by upward bending of the respective edge of the sheet metal part. The collar engaging in the stiffening portions of the mounting components reinforces the stiffness of the entire axle journal composite structure. Furthermore, it has the advantage in manufacturing that any fine punching may be dispensed with which would be required in case of a fully planar sheet metal part in order to achieve the necessary tight fit.

In a particular embodiment of the axle journal according to the invention the sheet metal parts forming the axle journal main body are adapted to be interconnected by screws which pass through the portions of the mounting components stiffening the axle journal and received in the cavity in question. This type of connection, on the one hand, results in a high load bearing capacity of the composite-structure axle journal of the invention and, on the other hand, permits disassembly of the mounting components without any great expenditure. Alternatively, the shaped sheet metal parts may be welded together once those portions of the mounting components which stiffen the axle journal have been introduced into the cavity. That provides an even higher load bearing capacity of the composite-structure axle journal, yet it has the disadvantage that disassembly no longer is easy. If the sheet metal parts are screwed together the screws preferably end in tapped holes formed in the outer ring of a wheel bearing. Thus the composite-structure axle journal according to the invention can be connected by screws to the outer ring of a wheel bearing to form one firm unit. Such an embodiment is particularly well suited for wheel bearings of the so-called third generation.

According to a preferred embodiment of the axle journal in accordance with the invention, the main body thereof is formed with an integral arm on which to fasten, for instance, a strut or an upper transverse link. The arm mentioned is formed in one piece with the main body of the axle journal and likewise is hollow.

Preferably the portions of the mounting components stiffening the axle journal are made of solid material. Yet they may also be made hollow. The sheet metal of the shaped sheet metal parts forming the main body of the axle journal has a thickness of about 3 millimeters in one embodiment. Yet the thickness of the material may be selected to be greater or smaller, depending on the required load bearing capacity.

All the embodiments mentioned above of the axle journal according-to the invention are preferably developed further in that those sections of the cavity in the main body which are not filled by the stiffening portions of the mounting components are filled, at least partly, by a foam of plastics, ceramics or metal. The above mentioned expression "metallic foam", in the present context, is understood to mean metals and alloys of cellular structure having a porosity of more than 50%, as a rule. Foaming further enhances the stiffness of axle journals according to the invention and, moreover, leads to improved noise dampening whereby the transmission of road surface noises to the vehicle body is reduced. Furthermore, the foam fill in those sections of the cavity not taken up by the stiffening portions provides better thermal distribution across the entire axle journal. Finally, such foaming counteracts corrosion within the cavity.

If such foam is employed to fill the remaining space in the main body cavity it is especially preferred for this foam to be connected intimately to the shaped sheet metal parts of which the main body is formed. This intimate connection between the foam and the sheet metal parts provides a distinct increase in strength of the axle journal according to the invention.

A particularly elegant method of producing axle journals according to the invention having the remaining space inside their main body filled with metallic foam makes use of sheet metal coated on one side, for example, with a mixture of aluminum and titanium hydride powder. From these metal sheets the sheet metal parts presenting the future main body are produced in such a way that the coated surface of the sheets faces inwardly, in other words it will be located later on inside the continuous cavity. Upon assembly of the shaped sheet metal parts with the stiffening portions the resulting axle journal is subjected to heat treatment and, as a consequence, the coating of aluminum and titanium hydride powder on the sheet metal expands, forming a foam which fills the existing cavity at least in part.

An embodiment of the axle journal according to the invention will be described in greater detail below with reference to the accompanying drawings, in which.

Figure 1:
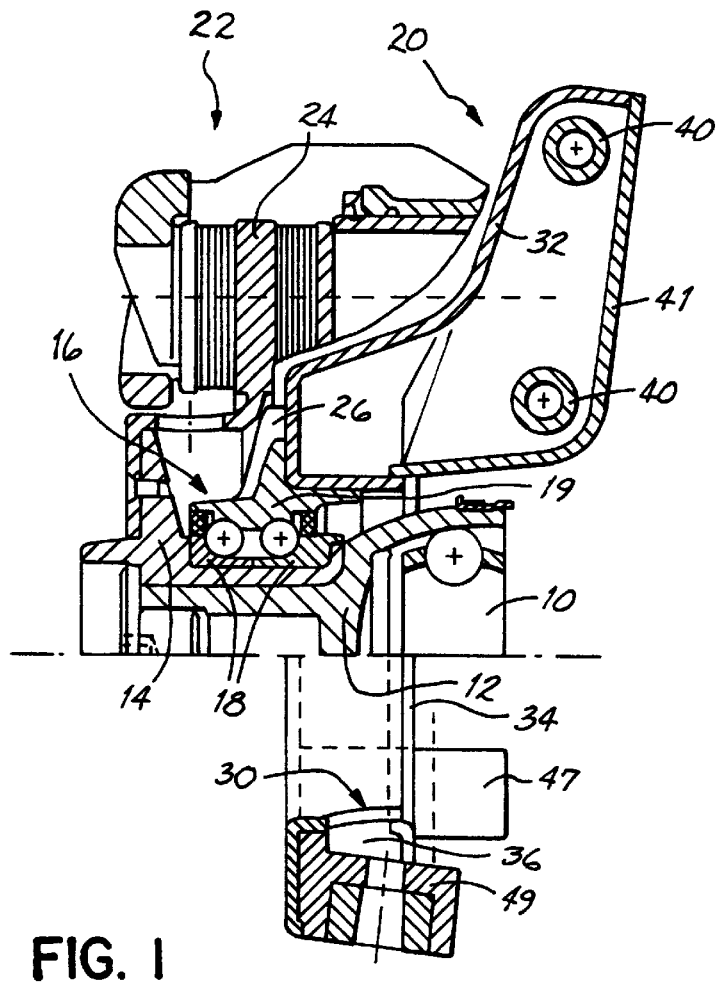
FIG. 1 is a cross sectional elevation of a structural unit comprising a drive shaft, a wheel hub, a wheel bearing, a disc brake, and an axle journal according to the invention.
Figure 2:
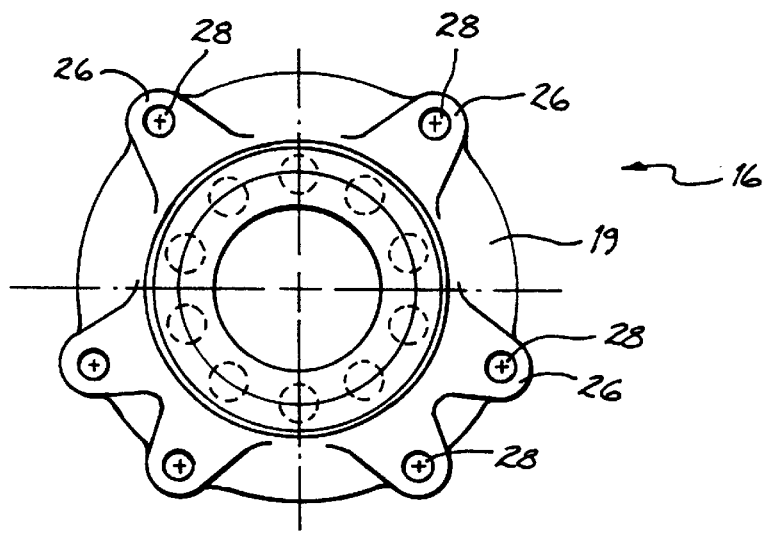
FIG. 2 is the top plan view of the wheel bearing of FIG. 1.

FIG. 1 illustrates a structural unit of the kind which may be used at the front axle of a passenger car designed for front wheel drive. It shows a homokinetic joint 10 of a drive shaft 12, to be seen only partly in FIG. 1 and extending further to the right, a wheel hub 14 into which the drive shaft 12 is introduced, and a wheel bearing 16 mounted on the wheel hub 14 and comprising two inner rings 18 and one outer ring 19 to which an axle journal 20 is fastened in compound construction thus forming a composite structure. The wheel bearing 16 is a bearing of the so-called third generation. As presented more clearly in the top plan view of the wheel bearing 16 in FIG. 2, the outer ring 19 comprises a number (six in the embodiment shown) of thickened radially projecting lugs 26 each formed with a threaded hole 28. These threaded holes 28 serve for fastening-of the axle journal 20 at the outer ring 19 of the wheel bearing 16, as will be described below. FIG. 1 further shows a floating caliper disc brake 22 the brake disc 24 of which is non-rotatably fixed to the wheel hub 14.

Figure 3:
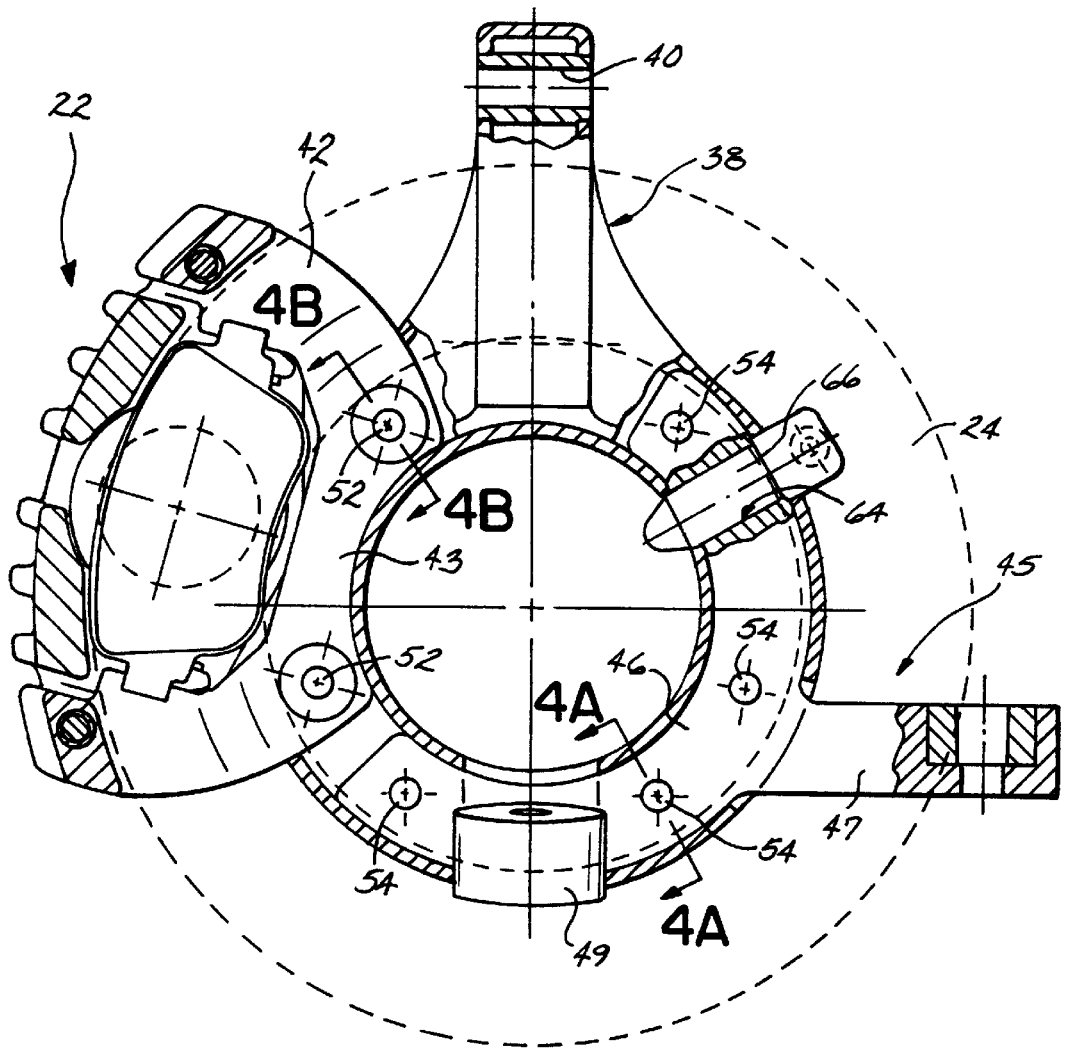
FIG. 3 is a part sectional top plan view of the composite-structure axle joint shown in FIG. 1.
Figure 5:
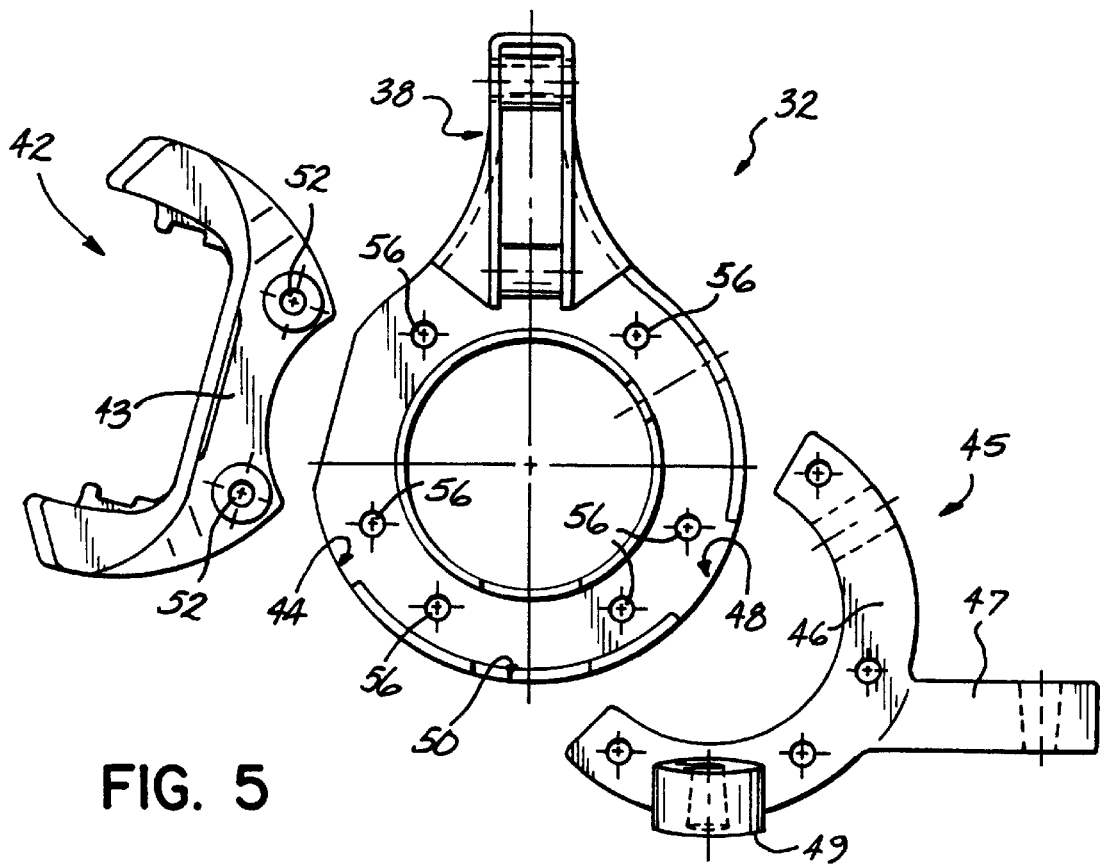
FIG. 5 shows a shaped sheet metal part of the composite-structure axle journal together with two mounting components.
Figures 6, 7:
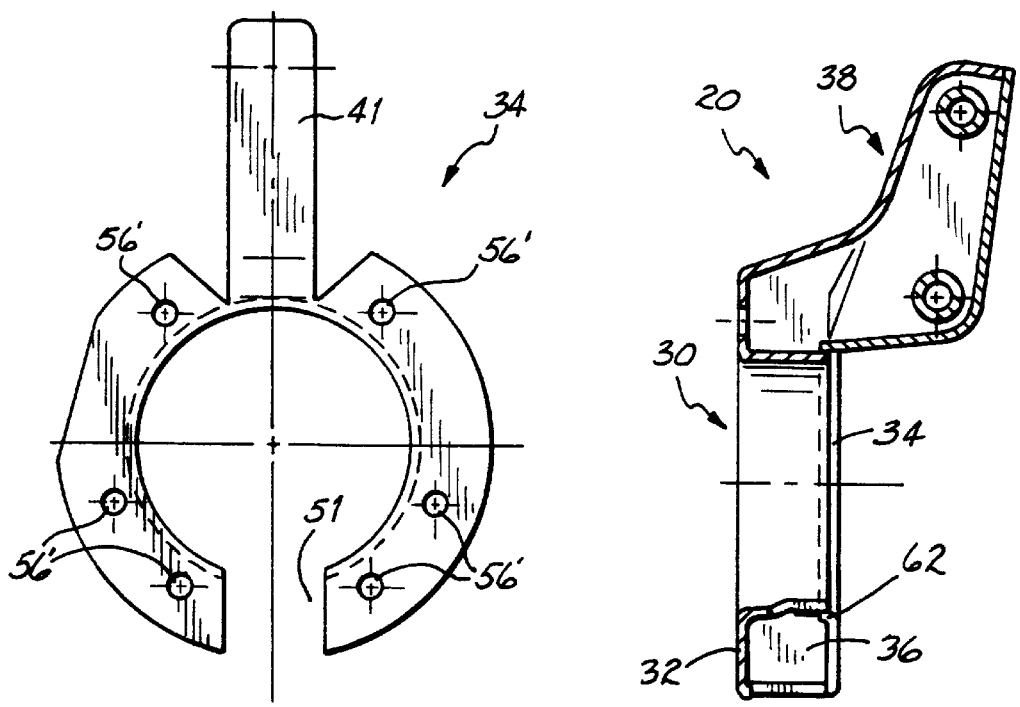
FIG. 6 shows another shaped sheet metal part of the composite-structure axle journal according to the invention.
FIG. 7 is a sectional elevation of the main body of the axle journal according to the invention composed of the sheet metal parts illustrated in FIGS. 5 and 6.

The detailed description below relates only to the axle journal 20 of interest here and to those structural members which cooperate with it in the overall compound. As best seen in FIGS. 1 and 3 in combination with FIG. 7, the axle journal 20 has a main body 30 of circular ring shape composed of two shaped sheet metal parts 32 and 34. Their configuration may be taken in particular from FIGS. 5 and 6. One sheet metal part 32 has a substantially U-shaped cross section (see FIG. 7), while the other sheet metal part 34 is largely planar. In the embodiment shown, the sheet metal of the sheet metal parts 32, 34 has a thickness of approximately 3 millimeters.

Together the two shaped sheet metal parts 32 and 34 define an inner cavity 36 substantially of torus shape whose function will be described in greater detail below. The one sheet metal part 32 is formed integrally with an arm 38 projecting essentially radially outwardly away from the main body 30. Two bushings 40 pass through the arm so that a strut (not shown) may be secured to the arm 38 of the axle journal 20 by screws, likewise not shown. Such struts which comprise a shock absorber and a helical spring concentrically surrounding the same are also known as Macpherson strut suspension. The open side of the hollow arm 38 facing the middle of the vehicle is closed by an adequately shaped tongue 41 which is formed in one piece with the other shaped sheet metal part 34 (see in particular FIGS. 6 and 7). The bushings 40 have end portions of slightly reduced diameter whereby continuous shoulders are formed at either end of the bushings 40 to offer support for the sheet metal side walls of the arm 38 when the strut (not shown) is fastened to the arm 38 by screws.

Figure 4B:
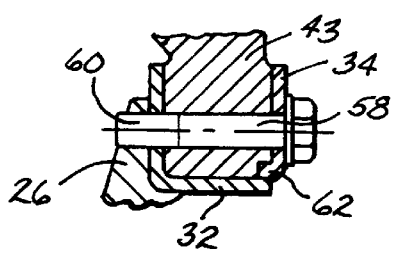
FIG. 4B shows sections 4B—4B of FIG. 3.
Figure 4A:
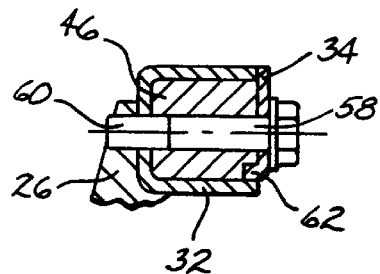
FIG. 4A shows sections 4A—4A of FIG. 3.

The continuous cavity 36 formed in the main body 30 is intended to cooperate with structural members serving to mount and fasten wheel suspension or steering gear elements or a brake on the axle journal 20. In the embodiment shown there are two such mounting components, one being a brake carrier member 42 of the disc brake 22 and the other one a combination 45 steering tie rod mount and transverse link seat. The brake carrier member 42 is formed with a web-like portion 43 for cooperation with the cavity 36 and it fits into the cavity 36, filling it at least almost all the way in the corresponding area (see FIGS. 4A and 4B). That part of the brake carrier member 42 which is not received in the cavity 36 projects outwardly through an opening 44 provided in the sheet metal part 32. In corresponding fashion, the combination 45 steering tie rod mount and transverse link seat is formed with a portion 46 having the shape of a circular ring segment which extends through approximately 190° in circumferential direction and which likewise fits in the cavity 36 of the main body 30, essentially filling it in the corresponding area, as may be gathered from FIG. 3. A steering tie rod 47, often also called steering knuckle arm, is formed integrally with the portion 46 from which it extends outwardly through an opening 48 in the outer peripheral wall of the sheet metal part 32. A seat 49 for a lower transverse link of the front wheel suspension unit and likewise made in one piece with the portion 46 passes in outward direction through another opening 50 in the sheet metal part 32 and through an opening 51 in the sheet metal part 34. It is obvious that the combination 45 steering tie rod mount and transverse link seat also may be made in two parts in which case the steering tie rod mount and the transverse link seat will each have a stiffening portion which fits into the cavity 36.

Assembly of the axle journal 20 is as easy as can be: Portion 43 of the brake carrier member 42 and portion 46 of the combination 45 steering tie rod mount and transverse link seat are placed in such a way in the sheet metal part 32 having the U-shaped cross section that bores 52 in portion 43 and bores 54 in portion 46, respectively, become aligned with corresponding bores 56 in sheet metal part 32. The portions 43 and 46 fit with minor radial clearance in the cavity 36. Thereupon the other sheet metal part 34 is joined to the sheet metal part 32 in such a manner that the tongue 41 provided on that other sheet metal part closes the open side of the arm 38 formed on the first sheet metal part 32. Bores 56' provided in the sheet metal part 34 thus will be aligned automatically with the bores 52, 54, and 56. Screws 58 are inserted through the bores 52, 54, 56, and 56' in order to firmly clamp together the shaped sheet metal parts 32, 34 and the portions 43 and 46 received in the cavity 36 defined by the sheet metal parts and to fasten this composite-structure axle journal to the outer ring 19 of the wheel bearing 16. Each screw 58 has a threaded end portion 60 which is guided into the corresponding threaded hole 28 in the outer ring 19, whereupon the screws 58 may be tightened. Upon tightening, a collar 62 formed at the inner circumference of the sheet metal part 34 engages in a corresponding recess provided in portion 43 and in portion 46, respectively, whereby a snug fit of the sheet metal part 34 is obtained.

In the embodiment shown, the brake carrier member 42 and the combination 45 steering tie rod mount and transverse link seat are made of metal alloys which are customary for such elements, and especially portions 43 and 46 of the elements mentioned consist of solid material. As may be taken from FIG. 3, the portions 43 and 46 fill more than three quarters of the circumferential extension of the cavity 36. In this manner the portions 43 and 46 stiffen the main body 30 of the axle journal 20 such that, once clamped together, load values of the axle journal 20 are achievable which are absolutely sufficient for the envisaged use. The weight saved here, as compared to axle journals of conventional design, is approximately 20%.

All that needs to be done to disassemble the disc brake 22 is to loosen the screws 58 which pass through the portion 43 of the brake carrier member 42, then the brake carrier member 42 can be pulled out radially through the opening 44. For increased strength, the outer peripheral wall of the sheet metal part 32, alternatively, may extend over the brake carrier member 42 in the central region. In that event, however, all the screws 58 must be loosened if the brake carrier member 42 is to be disassembled.

In the embodiment shown, the portion 46 of the combination 45 steering tie rod mount and transverse link seat has a radial passage opening 64 which is aligned with corresponding openings in the peripheral walls of the sheet metal part 32 and through which passes a rotational speed sensor 66 to deliver measured values to an antilock braking system (ABS) and/or an antispin regulation system (ASR) for traction control.

What is claimed is:

1. An axle journal (20) for a front axle of a front wheel drive motor vehicle, the axle journal (20) comprising a main body (30) made of sheet metal parts (32, 34) shaped so as to be suitable for interconnection and interconnected to enclose a circumferentially extending cavity (36), further characterized in that the cavity (36) is substantially of torus shape and receives portions (43, 46) of structural components of corresponding size and shape to fill the cavity (36), thereby to stiffen the axle journal, and serving to mount wheel suspension, or steering gear elements, or a brake (22) on the axle journal (20).

2. The axle journal as claimed in claim 1, characterized in that each of the portions (43, 46) which stiffen the axle journal (20) is part either of a brake carrier member (42) or a steering tie rod mount (47) or a transverse link seat (49), and the shaped sheet metal parts (32, 34) are formed with openings (44, 48, 50, 51) in order to accommodate portions of the brake carrier member (42), the steering tie rod mount (47), or the transverse link seat (49) which extend through the openings (44, 48, 50, 51) from the cavity (36).

3. The axle journal as claimed in claim 1, characterized in that the main body (30) of the axle journal (20) is formed of two shaped sheet metal parts (32, 34) of which one part (32) has a predominantly U-shaped cross section, while the other part (34) is of predominantly planar shape, the main body (30) being substantially ring shared.

4. The axle journal as claimed in claim 1, characterized in that the portions (43, 46) of the structural components which stiffen the axle journal (20) fill the cavity (36) by about at least one half.

5. The axle journal as claimed in claim 1, characterized in that the portions (43, 46) of the structural components which stiffen the axle journal (20) fill the cavity (36) by about at least two thirds.

6. The axle journal as claimed in claim 1, characterized in that the portions (43, 46) of the structural components which stiffen the axle journal (20) fill the cavity (36) by about at least three quarters.

7. An axle journal (20) comprising a main body (30) made of sheet metal parts (32, 34) adapted to be interconnected and in an interconnected state enclosing a circumferentially extending cavity (36) at least essentially of torus shape, wherein the cavity (36) receives portions (43, 46) of accordingly sized and shaped structural components for mounting wheel suspension or steering gear elements or a brake (22) on the axle journal (20) and wherein the receipt of the accordingly sized and shaped portions (43, 46) substantially fills the cavity (36) and enhances the structural integrity of the axle journal (20).

8. The axle journal as claimed in claim 7, characterized in that each of the portions (43, 46) which stiffen the axle journal (20) is part either of a brake carrier member (42) or a steering tie rod mount (47) or a transverse link seat (49), and the shaped sheet metal parts (32, 34) are formed with openings (44, 48, 50, 51) for those portions of the structure components not received in the cavity (36).

9. The axle journal as claimed in claim 7, characterized in that the main body (30), of the axle journal (20) is formed of two shaped sheet metal parts (32, 34) of which one part (32) has a predominantly U-shaped cross section, while the other part (34) is of predominantly planar shape, the main body (30) being substantially ring shaped.

10. The axle journal as claimed in claim 9, characterized in that the predominantly planar sheet metal part (34) has a circumferentially extending inner edge and includes a collar (62) which is formed at the circumferentially extending inner edge and projects into the cavity (36) to enter into engagement with the portions (43, 46) of the structural components stiffening the axle journal.

11. The axle journal as claimed in claim 7, characterized in that the shaped sheet metal parts (32, 34) are adapted to be interconnected by screws (58) which pass through the portions (43, 46) of the structure components stiffening the axle journal.

12. The axle journal as claimed in claim 11, characterized in that the screws (58) end in treaded holes (28) formed in a wheel bearing outer ring (19).

13. The axle journal as claimed in claim 7, characterized in that the main body (30) of the axle journal (20) is integrally formed with an arm (38) to mount a strut.

14. The axle journal as claimed in claim 7, characterized in that the portions (43, 46) of the structure components stiffening the axle journal are made of solid material.

15. The axle journal as claimed in claim 7, characterized in that a section of the cavity (36) not taken up by the portions (43, 46) of the structural components stiffening the axle journal is filled, at least in part, with foam.

16. The axle journal as claimed in claim 15, characterized in that the foam used to fill the section of the cavity (36) not taken up by the portions (43, 46) of the mounting components stiffening the axle journal is a metallic foam.

17. The axle journal as claimed in claim 7, characterized in that the sheet metal of the shaped sheet metal parts (32, 34) has a thickness of about 3 mm.

18. The axle journal as claimed in claim 17, characterized in that the sheet metal of which the shaped sheet metal parts (32, 34) are made is coated on one side such that heat treatment of the shaped sheet metal parts (32, 34) causes a metallic foam to develop.

19. The axle journal as claimed in claim 18, characterized in that the metal sheets of which the shaped sheet metal parts (32, 34) are made are coated on one side with a mixture of aluminum and titanium hydride powder.

20. The axle journal as claimed in claim 19, characterized in that the portions (43, 46) of the structural components which stiffen the axle journal (20) fill the cavity (36) by about at least one half.

21. The axle journal as claimed in claim 19, characterized in that the portions (43, 46) of the structural components which stiffen the axle journal (20) fill the cavity (36) by about at least two thirds.

22. The axle journal as claimed in claim 19, characterized in that the portions (43, 46) of the structural components which stiffen the axle journal (20) fill the cavity (36) by about at least three quarters.

23. An axle journal (20) for a front axle of a front wheel drive motor vehicle, the axle journal (20) comprising a main body (30) made of sheet metal parts (32, 34) shaped so as to be suitable for interconnection and interconnected to enclose a circumferentially extending cavity (36), further characterized in that the cavity (36) is substantially of torus shape and is also sized and shaped to receive portions (43, 46) of structural components of corresponding size and shape, to stiffen the axle journal, and serving to mount wheel suspension, or steering gear elements, or a brake (22) on the axle journal (20), characterized in that each of the portions (43, 46) which stiffen the axle journal (20) is part either of a brake carrier member (42) or a steering tie rod mount (47) or a transverse link seat (49), and the shaped sheet metal parts (32, 34) are formed with openings (44, 48, 50, 51) in order to accommodate portions of the brake carrier member (42), the steering tie rod mount (47), or the transverse link seat (49) which extend through the openings (44, 48, 50, 51) from the cavity (36).

24. An axle journal (20) comprising a main body (30) made of sheet metal parts (32, 34) adapted to be interconnected and in an interconnected state enclosing a circumferentially extending cavity (36) at least essentially of torus shape, wherein the cavity (36) is sized and shaped to receive portions (43, 46) of accordingly sized and shaped structural components for mounting wheels and suspension for steering gear elements or a brake (22) on the axle journal (20) and wherein the receipt of the accordingly sized and shaped portions (43, 46) enhances the structural integrity of the axle journal (20), characterized in that each of the portions (43, 46) which stiffen the axle journal (20) is part either of a brake carrier member (42) or a steering tie rod mount (47) or a transverse link seat (49), and the shaped sheet metal parts (32, 34) are formed with openings (44, 48, 50, 51) for those portions of the structural components not received in the cavity (36).

* * * * *

UNITED STATES PATENT AND TRADEMARK OFFICE
CERTIFICATE OF CORRECTION

PATENT NO. : 6,152,466
DATED : November 28, 2000
INVENTOR(S) : Eckart Op den Camp and Ulrich Seuser It is certified that error appears in the above-identified patent and that said Letters Patent is hereby corrected as shown below:

Column 1,
Line 51, reads "two thirds" and should read -- two-thirds --.
Line 52, reads "three quarter" and should read -- three-quarters --.

Column 2,
Line 6, reads "cross sectional" and should read -- cross-sectional --.
Line 31, reads "thoseÿportions" and should read -- those portions --.
Line 58, reads "...according-to the..." and should read -- ...according to the ... --.

Column 3,
Line 29, reads "cross sectional" and should read -- cross-sectional --.

Column 4,
Line 40, reads "(see FIGS. 4A and 4B)." and should read
-- (see FIGS. 3, 4A and 4B). --

Signed and Sealed this

Twenty-fourth Day of June, 2003

JAMES E. ROGAN
*Director of the United States Patent and Trademark Office*